United States Patent [19]

Dill et al.

[11] 4,107,057

[45] Aug. 15, 1978

[54] METHOD OF PREPARING AND USING ACIDIZING AND FRACTURING COMPOSITIONS, AND FLUID LOSS ADDITIVES FOR USE THEREIN

[75] Inventors: Walter R. Dill; Eugene A. Elphingstone, both of Duncan, Okla.

[73] Assignee: Halliburton Company, Duncan, Okla.

[21] Appl. No.: 760,485

[22] Filed: Jan. 19, 1977

[51] Int. Cl.$^2$ .................... E21B 43/27; E21B 43/26
[52] U.S. Cl. .................... 252/8.55 C; 166/282; 166/283; 252/8.55 R; 260/29.6 SQ; 260/29.6 TA; 260/29.6 RW; 526/306
[58] Field of Search .................. 252/8.55 R, 8.55 C; 166/282, 283; 260/29.6 SQ; 526/306

[56] References Cited

U.S. PATENT DOCUMENTS

| | | | |
|---|---|---|---|
| 2,763,326 | 9/1956 | Cardwell et al. | 252/8.55 X |
| 2,801,985 | 8/1957 | Roth | 526/306 X |
| 3,254,904 | 5/1966 | Carpenter | 252/8.55 |
| 3,547,899 | 12/1970 | Arlt et al. | 260/29.6 SQ X |
| 3,679,000 | 7/1972 | Kaufman | 252/8.55 X |
| 3,727,689 | 4/1973 | Clampitt | 166/283 |
| 3,803,091 | 4/1974 | Murfin | 526/306 X |
| 3,931,089 | 1/1976 | Karl | 260/29.6 SQ |

*Primary Examiner*—Herbert B. Guynn
*Attorney, Agent, or Firm*—Thomas R. Weaver; William R. Laney; John H. Tregoning

[57] ABSTRACT

A well acidizing or fracturing composition is prepared by adding to an aqueous acid solution or emulsion or fracturing composition, a cross-linked copolymer of a sulfonic acid-modified acrylamide and a polyvinyl cross-linking agent. The cross-linked copolymer functions as an effective fluid loss additive and/or diverting agent. From about 25 pounds to about 100 pounds of the additive is utilized per 1000 gallons of the aqueous acid solution or acid emulsion.

17 Claims, No Drawings

METHOD OF PREPARING AND USING ACIDIZING AND FRACTURING COMPOSITIONS, AND FLUID LOSS ADDITIVES FOR USE THEREIN

In the production of oil and gas from subterranean formations, a procedure is often used to stimulate the well and increase production by pumping an aqueous acid solution into the producing formation. On some occasions, acidizing is combined with a stimulation technique known as fracturing by applying sufficient pressure to the acid solution in the well bore to cause the acid to fracture and split the formation adjacent the well, thereby forming artificially enlarged passageways in the earth by hydraulic action, and concurrently subjecting them to the solvent action of the acid.

In such acidizing operations, the acid solution is pumped into the zone at a rate and pressure sufficient to hydraulically fracture the zone. This procedure inherently and without further refinement offers little control over the bleed-off of the acid through the fracture faces, and the net result is a short fracture radius compared to that accomplished without bleed-off from the fracture. For this reason, it is often desirable to place a fluid loss material in the acid (or fracturing fluid) that will mechanically filter out on the fracture faces, greatly decreasing the fluid loss through the fracture faces, and accomplishing greater fracture extension from the well bore.

In other acidizing operations, the acid solution is injected into an acid-soluble pay zone where its dissolving action enlarges existing voids and thereby increases permeability of the zone. This procedure inherently, and without further refinement, offers little control over the interval of pay section which is acid treated. In general, the most permeable spots receive more intense treatment. For this reason, it is often desirable to temporarily but selectively plug or block portions of the formation with a solid or semi-solid material so that the acid treating fluid is caused to flow to other portions of the formation. Studies of the action of acid on cores taken from calcareous formations have indicated that the action of the acid occurs mostly at the core face exposed to the acid, with a relatively lesser amount of action occurring at the small interstitial spaces and interconnected pore passageways within the core. Diverting agents which coat the face of the matrix to reduce the action of the acid at this location have been proposed, so that an acid can be distributed more uniformly through the zone.

A variety of materials have heretofore been proposed to seal off or protectively coat certain areas or zones during acidizing or fracturing and work-over operations so as to improve the effectiveness of the acidizing, and reduce fluid losses occurring through the bleeding or channeling of acid into less productive passageways, and unwanted and uncontrolled diversion of the acid or fracturing fluid into zones of lesser importance with resultant waste and increase in expense. Such materials have included various types of natural gums, certain types of inorganic coating materials, such as sodium silicate, and various organic gels derived from polymerized or copolymerized materials. In the latter category of additives to acidizing and acid fracturing compositions, a number of types of gels have been used, including polyacrylic acid gels and copolymers of acrylamide and N-vinylpyrolidone.

Some of the gel compositions which have been used as additives to well acidizing and fracturing compositions have worked well under certain conditions, but are generally subject to limitations upon their effectiveness. Considerable care must be exercised in the preparation of certain cross-linked polymeric gels, and particularly those of acrylamide, because the selection of cross-linking agents for acrylamide and similar compounds requires that there be a relatively precise matching of the reactivity of the cross-linking agent and the acrylamide in order to obtain the desired degree of copolymerization. Any mismatching often results in the formation of two separate polymers differing in the degree to which the cross-linking compound is included in each. The polymer which is rich in the cross-linking material tends to precipitate as a hard solid, while the polymer which is poor in the cross-linker provides only a viscous syrup rather than the needed gel of relatively high stability.

In other types of polymeric additives, the shelf life or stability of the polymer is short-lived, with degradation resulting in a relatively short period of time, particularly at elevated temperatures. Since in many contexts of usage, the temperature of the pay zone to be acidized is relatively high, obvious limitations on the usage of polymeric gels of this type are encountered.

Other types of fluid loss or diverting agent additives which have been utilized in acidizing compositions are less than optimum in performance as a result of their tendency to remain more or less permanently in the pores of the matrix after acidizing has been completed, thus partially plugging the pores and reducing permeability of the matrix in a counterproductive fashion.

Yet another disadvantage which is encountered in the use of some otherwise highly satisfactory diverting agents or fluid loss additives is the difficulty encountered in the preparation and addition of the additives to the acidizing compositions. A few are difficult to prepare and add to the acid composition in the field, and require packaging or storage for the containment of toxic or corrosive reactant materials prior to the time that the additive is compounded and added at the site of use.

The present invention provides a fluid loss and diverting agent additive which can be relatively easily prepared, and is characterized in having excellent performance characteristics in preventing worm-holing and channeling in the matrix, and in affording excellent acidizing control. The additive can also be used as an effective diverting agent in fracturing compositions.

Broadly described, the fluid loss and diverting agent additive of the invention is a copolymer of a sulfonic acid-modified acrylamide and a polyvinyl cross-linking agent. The copolymer additive can be in the form of a dry particulate solid, or can be in aqueous solution in the form of a gel. In the environment of the acidizing composition, the additive exists as small particles of gel (fish eyes). The dry additive is incorporated in the acidizing composition in an amount of from about 25 pounds per 1000 gallons of the aqueous acid solution to about 100 pounds per 1000 gallons of the acid solution.

In another aspect, the invention relates to acidizing and fracturing methods, and entails the use of acidizing compositions prepared in accordance with the invention in treating a pay zone adjacent a well bore by injection of the composition into the pay zone, either to acidize the existing matrix without development and propagation of further and additional fractures, or at higher pressures to develop and extend new fractures into the formation. The injection of the acidizing or fracturing composition is carried out at temperatures from ambient temperature up to about 400° F.

The acidizing compositions of the invention can further contain certain conventional additives, including corrosion inhibitors, emulsion breaking agents, scale prevention inhibitors, paraffin inhibitors, friction reducers, clay stabilizers and the like.

The copolymeric fluid loss additives of the invention offer a number of advantages in use. They function to effectively prevent channeling and eliminate worm-holing in the matrix, yet do not in any way permanently damage, or decrease to any significant degree, the permeability of the matrix. The additive compositions can be prepared as a gel or in dry particulate form. The compounds which are admixed and interreacted to form the cross-linked copolymer additive can be mixed in the field or premixed. The copolymer additive is stable in substantially all acidizing solutions currently in use, and also in acid emulsions used for acidizing and fracturing, and in many conventional fracturing fluids. The additive exhibits excellent temperature stability, and can be effectively utilized in live acid solutions at temperatures up to 400° F without degradation or decomposition. Further, the fluid loss additives of the invention are compatible with other additives and components conventionally used in acidizing compositions.

It is also an important advantage of the invention that the copolymer additives can be caused to undergo polymerization and reach a highly gelled state in less than about two minutes, as compared to about four hours gelling time which has been required in the preparation of certain other types of acrylic copolymers heretofore in use as acidizing fluid loss and diverting agent additives.

Finally, when the fluid loss additive of the invention is prepared in dry particulate form, it can vary widely in particle size without loss of effectiveness in use.

Having broadly alluded to the fluid loss and diverting agent additives of the invention and to the acidizing compositions in which they are included, and having cited certain salient characteristics and advantages of the acidizing compositions of the invention, the subsequent description herein will be directed to a consideration of certain preferred embodiments of the invention, and to a detailed description of these embodiments in conjunction with examples set forth as illustrative of typical practice of the invention utilizing certain preferred embodiments.

As has been previously stated, the active or effective additive components of the acidizing compositions of the invention are copolymers of a sulfonic acid-modified acrylamide monomer and of a cross-linking monomer which is a polyvinyl compound.

The sulfonic acid-modified acrylamide may also be described as a β-sulfonated alkylamide having the formula

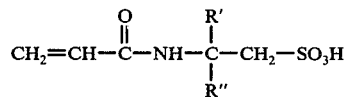

wherein R' and R" are selected from the group consisting of $CH_3-$, $CH_2Cl-$, $CH_3CH_2-$, $CH_3-CH_2-CH_2-$, and H, and may be the same or different. Suitable β-sulfonated alkyl amides include 2-acrylamido-2-methylpropanesulfonic acid, 2-acrylamido-2-methylbutanesulfonic acid, 2-acrylamido-2-ethylbutanesulfonic acid, 2-acrylamidopropanesulfonic acid, 2-acrylamido-2-chloromethylpropanesulfonic acid and 2-acrylamido-2-chloromethylbutanesulfonic acid. The preferred β-sulfonated alkyl amide used as the acrylamido monomer component of the copolymer of the invention is 2-acrylamido-2-methylpropanesulfonic acid.

The polyvinyl monomer used as a cross-linking agent for forming the copolymer additive by reaction with the sulfonic acid-modified acrylamide described is one which has at least a small amount of water solubility, and contains two or more ethylenically unsaturated vinyl groups with a molecular structure adapted to facilitate polymerization matching with the acrylamido monomer. Suitable cross-linking agents are generally well known and understood in the art. A partial and non-exclusive listing of these includes N,N'-methylenebisacrylamide and other alkylidene bisacrylamide compounds in which the alkylidene group is of relatively low carbon atom content (1–3), diallyl phosphate, triallyl phosphate, triallyl carbonate, and urelyene bis(N-methyleneacrylamide). The selected cross-linking agent should have a water solubility at 60° F of at least 0.5 percent by weight of the monomer in the aqueous solution. N,N'-methylenebisacrylamide constitutes the preferred cross-linking compound for forming the copolymer additive used in the invention.

Copolymerization of the sulfonated acrylamide monomer and the polyvinyl group-containing cross-linking agent is effected in an aqueous environment. The cross-linking agent is utilized in an amount of from about 0.1 weight percent to about 20 weight percent of the final composition of the copolymer produced by the cross-linking reaction, with about 0.1 to about 1.0 weight percent of the cross-linking agent being preferred. The copolymerization is preferably carried out in the aqueous solution at a total concentration of both monomers in the solution of from about 0.1 weight percent to about 40 weight percent. The preferred aqueous solution concentration of the acrylamide monomer and cross-linking agent together is approximately 10 weight percent. The mole ratio of the monomers in the final cross-linked preferred copolymer is about 11.4:1, sulfonated acrylamide to polyvinyl cross-linker (N,N'-methylenebisacrylamide).

Before or after the acrylamide monomer and cross-linking monomer have been added to the aqueous polymerization environment, a sufficient amount of an alkali metal hydroxide, ammonium hydroxide or other suitable neutralizing base is added to the solution to neutralize the sulfonic acid-modified acrylamide. Preferably, the pH of the solution is adjusted to from about 7.5 to about 12, with a pH of from 8.5 to 9.5 being preferred.

A polymerization catalyst is next added to the reaction mixture. The catalyst system used for catalyzing the copolymerization reaction can include a compound effective to initiate free radical formation over a relatively elevated temperature range, and may be termed, in such event, an initiator-catalyst not requiring the further inclusion of a separate catalyst in order to initiate the copolymerization. Because of the desirability of carrying out the copolymerization reaction as here practiced at relatively low (ambient) temperatures, however, a preferred system for use in the present invention is a redox catalytic system in which any one of a number of oxidizing agents act as activators or initiators of the reaction, and their activating action is catalyzed by the inclusion in the redox coupling of a reducing agent.

The types of free radical initiators which are suitable in such a preferred redox system include ammonium peroxodisulfate, alkali metal peroxodisulfates, hydrogen peroxide, alkali metal peroxides, alkali metal and ammonium perchlorates, sodium perborate, peracetic acid and certain high temperature organic peroxides such as tertiary butyl hydroperoxide.

In conjunction with the inorganic oxidizing agents mentioned as suitable initiators or activator compounds, a catalytic material which catalyzes the initiation of the copolymerization reaction is included in the redox coupling. Preferably, a tertiary amine compound is used, such as triethanolamine. Nitrilotrispropionamide and dimethylaminopropionitrile are examples of other suitable catalysts. The preferred initiator used in carrying out the copolymerization is ammonium persulfate and the preferred catalyst is triethanolamine.

The amount of the activator (oxidizing agent) used in the reaction is from about 1 weight percent to about 10 weight percent, based on the weight of the sulfonic acid-modified acrylamide monomer used. Preferably, from about 3 weight percent to about 6 weight percent of the activator is employed. The amount of the catalyst used depends to some extent on the particular catalyst employed, but in the case of the preferred triethanolamine catalyst, from about 10 weight percent to about 45 weight percent, and preferably from about 25 weight percent to about 35 weight percent, is utilized, based on the weight of the sulfonic acid-modified acrylamide monomer.

Although the use of an accelerator compound is not critical to the accomplishment of the cross-linking reaction to produce the fluid loss additive of the invention, inclusion of a suitable accelerator is preferred in order to expedite the cross-linking process. Such accelerators are well known in the art. A typical one which functions well in the cross-linking reaction of the present invention is sodium sulfite. Copolymerization times of from about ten seconds up to about 30 minutes can be employed with selective control being effected by the amount of activator and accelerator used in the mixture. Preferably, where an accelerator such as sodium sulfite is used, it is added to the oxidizing agent solution and the monomer solution before they are mixed together.

In general, the concentrations of the monomer reactants, the catalyst, the activator and the accelerator in the aqueous medium in which the copolymerization is carried out can be decreased in order to make a more water soluble product, or can be increased to make a more inert, less soluble cross-linked copolymer. In this connection, reference is again made to the upper and lower practical limits on the amount of the sulfonic acid-modified acrylamide monomer utilized as hereinbefore set forth.

As previously indicated herein, the copolymer product constituting the fluid loss or diverting agent additive of the invention can be prepared in the form of a gel, or can be prepared as a dry, particulate solid. In general, in preparing the cross-linked copolymer, all of the reactants are blended in an aqueous solution except for the sodium persulfate or other oxidizing agent and any accelerator which may be combined therewith. This solution is then combined with an aqueous solution of the oxidizing compound to initiate the copolymerization.

In a typical preparation of the copolymer, the sulfonic acid-modified acrylamide monomer is added to water in an amount of from about 0.5 to about 3.0 lbs. per gallon, and from about 0.01 to about 0.70 lb. per gallon of N,N'-methylenebisacrylamide is added to the same solution after the monomer has been neutralized by the addition of a suitable base such as sodium hydroxide. The mixture is agitated until solution of the monomers is complete. An effective amount of a tertiary amine copolymerization catalyst is then added to the solution. Where triethanolamine is used, from about 0.05 to about 0.2 gallon of the catalyst per gallon of the solution can be used.

A second aqueous solution is then made up to contain from about 0.1 to about 0.5 lb. of a persulfate oxidizing agent per gallon of water, along with small amounts of an accelerator compound, if desired, and the two aqueous solutions are then combined to commence the copolymerization.

Where the solid is to be prepared, a salt is added to the reaction mixture initially developed to make the drying of the gel more efficient and expeditious. A number of salts can be employed, but the alkali metal chlorides and ammonium chloride are preferred. Where one of these preferred salts is used, it is added to the cross-linked copolymer gel in a concentration of from about 6.7 weight percent to about 8.0 weight percent, based on the total wet weight of the copolymer. After drying, the weight of the salt in the dried, particulate product is from about 40 weight percent to about 48 weight percent. A concentration of about 44 weight percent (dry basis) is preferred, and ammonium chloride constitutes the preferred salt utilized for this purpose by reason of its better compatibility with the reaction mixture.

The gel which results from the copolymerization reaction can be dispersed in acid to form small gel particles (fish eyes) which provide the desired fluid loss control, or alternatively, the particulate solid copolymer particles hydrate when added to acid solution and form gel particles which provide the desired fluid loss control.

In making up the acidizing or fracturing composition to include the fluid loss additive of the invention, from about 25 to about 100 pounds (from about 0.30 weight percent to about 1.2 weight percent of acid) of the copolymer additive are utilized in about 1000 gallons of acid. This stated quantitative addition refers to the weight of the actual active component (pure copolymer) which is added to the 1000 gallons of acid. Preferably about 50 lbs. of copolymer are incorporated in each 1000 gallons of acid. At either relatively higher matrix permeabilities (above about 1 millidarcy), or higher temperatures (above about 250° F), the copolymer concentration is increased.

The cross-linked copolymer additive can be dispersed in a variety of acidizing solutions, or in fracturing compositions, by circulating the acidizing or fracturing composition containing it through a jet. The cross-linked copolymer can also be prepared in a tank and passed through a shredder after gellation so that it is in acid-dispersible form prior to packaging. Laboratory tests indicate that the shredded particles of copolymer gel do not reconsolidate.

In one method of field preparation, mixing of the aqueous solution of the two monomers with the solution containing the initiator can be carried out in a mixing tube, and the mixture transferred from such tube to a high-pressure line for direct delivery into the acid solution. The high-pressure line used in this instance is long enough for adequate cross-linking to occur, and the extrusion pressure is sufficient for continuous extrusion of the gelled copolymer from the end of the high-pressure line. Preferably, in field preparation and addition to the acid solution, the cross-linked copolymer is extruded through a perforated stinger having 1/16 inch perforations therein in order to achieve better dispersion of the gel particles in the acid. The pump rates of the acid and of the cross-linked copolymer can be correlated to provide an accurate, uniform concentration of the copolymer in the acid.

As previously indicated, where the dry particulate copolymer is prepared, it can be packaged, transported to the site of usage, and then rehydrated upon addition to the acidizing or fracturing fluid. In all cases, the copolymer should be added to an acidizing base fluid after the concentrated acid and water have been mixed.

The copolymer fluid loss additive is stable in air at temperatures up to about 450° F, at which temperature the product starts to char. Good stability in conventional aqueous acidizing solutions has been observed at temperatures up to 350° F. The additive is insoluble in oil and is compatible with all of the types of acids currently used in acidizing treatments, including HCl, HF, HCl-organic acid blends, and acid emulsions such as currently used water-in-oil and oil-in-water acid emulsions. Typically such emulsions can contain from about 10 weight percent to about 70 weight percent of an oleaginous base liquid emulsified with from about 30 weight percent to about 90 weight percent of an aqueous HCl acid solution containing from about 15 weight percent to about 30 weight percent of HCl. Good compatibility with other additives frequently incorporated in the acidizing and fracturing compositions is also characteristic of the fluid loss and diverting agent additives of the invention. A preferred acidizing composition of the invention contains about 50 pounds of copolymer in about 1000 gallons of 15 weight percent aqueous HCl solution.

Where the dry solid particulate copolymer is prepared, it is preferred that the particles have a size ranging between retention of not more than 10 weight percent of the particles on a 40 mesh U.S. Standard Sieve to passage of not more than 20 weight percent through a U.S. Standard Sieve of 325 mesh. Preferably, the range of particle sizes of the dry solid copolymer particles is such that the distribution on several sieves is as follows:

| Sieve Size (U.S. Standard) | Percent On (+) or Through (−) Each Sieve |
|---|---|
| + 40 | 2 |
| − 40 +100 | 31 |
| −100 +200 | 32 |
| −200 +325 | 17 |
| −325 | 18 |

The following examples illustrate the preparation of the cross-linked copolymer compounds constituting the fluid loss/diverting agent additives of the invention, and are also illustrative of the preparation and testing of acidizing compositions prepared in accordance with the invention and including the described additives. Unless otherwise indicated in the examples, reference to cross-linked copolymer connotes the copolymer of 2-acrylamido-2-methylpropanesulfonic acid and N,N'-methylenebisacrylamide.

EXAMPLE 1

In order to prepare 100 gallons of cross-linked copolymer, 80 lbs. of 2-acrylamido-2-methylpropanesulfonic acid and 4 lbs. of N,N'-methylenebisacrylamide are dissolved in 80 gallons of water, and the pH of the solution is adjusted to about 9 with ammonium hydroxide. Sufficient additional water and 0.6 gallon of triethanolamine are then mixed uniformly into the solution to provide 95 gallons of solution. Finally, 5 gallons of an aqueous solution containing 10 weight percent ammonium persulfate are dispersed uniformly in the solution, and the solution is allowed to stand until a solid copolymer gel results.

EXAMPLE 2

A standard apparatus employed for the purpose of testing fluid loss in formation cores is a Hassler sleeve. The Hassler sleeve apparatus includes a fluid-tight reservoir that contains a floating piston. Kerosene is pumped to move the piston and displace the test fluid to the horizontally positioned Hassler sleeve. The heads on the Hassler sleeve are designed to allow test fluid to flow across the end of the core and deliver the test fluid that flows through the core at a given differential pressure across the core to a graduated cylinder for a fluid loss measurement. The sleeve is constructed of a strong elastic material and is provided with a hydraulic liquid seal about its circumference exerting sufficient pressure on the sleeve to prevent any passage of liquid between the core and the elastic sleeve. The graduated cylinder is positioned under the outlet end of the sleeve so that the flow from the reservoir into the sleeve through the formation core, and from the sleeve into the graduated vessel, can be measured.

Using a Hassler sleeve apparatus heated to 200° F, a series of Bedford limestone cores, each 6.5 inches long and 1.75 inches in diameter, are subjected to fluid loss tests using the acidizing composition of the present invention, as well as other comparable, commercially available acidizing compositions. In each of the tests, a 15 percent aqueous hydrochloric acid solution containing about 0.5 weight percent corrosion inhibitor, in addition to the copolymer additives of the present invention, or other fluid loss additive, is forced through the core. In some of the tests, prior to acidizing the core, kerosene is initially utilized for measuring the permeability to kerosene flow in the core. In other tests, the initial flow is measured using kerosene, followed by brine solution, followed by the acidizing solution. The particular differential pressure across the core in the Hassler sleeve, as developed by pumping kerosene to displace a floating piston in the test fluid reservoir, which in turn displaces the acidizing composition in each test, is indicated in Table I. The particular additives utilized in the acidizing compositions as fluid loss/diverting agents in the tests carried out and referred to in Table I are identified in Table II. Where an aqueous gel is added to the acid, the amount of added gel is given in gallons, and where a solid fluid loss additive is used, the amount added is stated in pounds.

TABLE I

| Additive, lbs. or gal./1000 gal. aqueous acid | Kerosene ml/min. | Perm., mds. | Brine Flow ml/min. | ΔP (psi) | Acid Flow (mls/minutes) | | | | |
|---|---|---|---|---|---|---|---|---|---|
| | | | | | 1 min. | 4 min. | 9 min. | 16 min. | 25 min. |
| 50 gal. A | 7.4 | 2.5 | — | 500 | 4 | 10 | 14 | 20 | 26 |
| 50 gal. A | 18.0 | 6.2 | — | 500 | B.T.[1] | — | — | — | — |
| 100 gal. A | 3.0 | 1.0 | — | 500 | 2 | 4 | 6 | 8 | 10 |
| 100 gal. A | 13.0 | 4.5 | — | 500 | 6 | 11 | 16 | 20 | 25 |
| 100 gal. A | 20.0 | 6.9 | — | 500 | 5 | 13 | 18 | 24 | 32 |
| 100 gal. A | 28.0 | 9.7 | — | 500 | 12 | 19 | 27 | 33 | 42 |
| 100 gal. A | 49.0 | 17.0 | — | 500 | 9 | 30 | 40 | 49 | 57 |
| 100 gal. A | 60.0 | 20.9 | — | 500 | B.T. | — | — | — | — |
| 150 gal. A | 28.0 | 9.7 | — | 500 | 10 | 19 | 35 | 45 | 57 |
| 150 gal. A | 40.0 | 13.9 | — | 500 | 12 | 23 | 35 | 46 | 59 |
| 150 gal. A | 46.0 | 16.0 | — | 500 | 10 | 20 | 29 | 38 | 49 |
| 150 lbs. B | 3.5 | 1.2 | — | 500 | B.T. | — | — | — | — |
| 150 lbs. B | 4.5 | 1.5 | — | 500 | B.T. | — | — | — | — |
| 150 lbs. B | 4.5 | 1.5 | — | 500 | B.T. | — | — | — | — |
| 25 gal. A 25 gal. C | 16.0 | 5.5 | — | 500 | 7 | 17 | 40 | B.T. | — |
| 50 gal. A 25 gal. C | 17.0 | 5.9 | — | 500 | 8 | 15 | 24 | 36 | 48 |
| 100 gal. A 25 gal. C | 18.0 | 6.2 | — | 500 | 8 | 14 | 20 | 28 | 41 |
| 50 gal. A 150 lbs. B | 40.0 | 13.9 | — | 500 | 12 | 25 | 42 | 51 | 62 |
| 100 gal. A 150 lbs. B | 4.0 | 1.4 | — | 500 | 8 | 16 | 24 | 32 | 40 |
| 100 gal. A 150 lbs. B | 6.0 | 2.1 | — | 500 | 4 | 7 | 11 | 14 | 18 |
| 100 gal. A 150 lbs. B | 8.0 | 2.7 | — | 500 | 7 | 11 | 14 | 18 | 22 |
| 100 gal. A 150 lbs. B | 15.0 | 5.2 | — | 500 | 8 | 15 | 22 | 32 | 40 |
| 100 gal. A 150 lbs. B | 16.0 | 5.5 | — | 500 | 7 | 12 | 17 | 24 | 31 |
| 100 gal. A 150 lbs. B | 23.0 | 8.0 | — | 500 | 8 | 18 | 26 | 34 | 44 |
| 100 gal. A 150 lbs. B | 23.0 | 8.0 | — | 500 | 11 | 18 | 26 | 34 | 42 |
| 100 gal. A | 7.0 | 2.4 | 2 | 500 | 3 | 8 | 14 | 20 | 27 |
| 100 gal. A | 16.0 | 5.5 | 3 | 500 | 4 | 15 | 27 | 26 | 44 |
| 100 gal. A | 35.0 | 12.1 | 8 | 500 | 9 | B.T. | — | — | — |
| 150 lbs. B | 9.0 | 3.1 | 2 | 500 | 2 | 6 | 12 | 19 | 29 |
| 150 lbs. B | 15.0 | 5.2 | 3 | 500 | 3 | 12 | 25 | 33 | 43 |
| 150 lbs. B | 34.0 | 11.8 | 5 | 500 | 9 | B.T. | — | — | — |
| 150 lbs. B | 64.0 | 22.3 | 10 | 500 | 18 | B.T. | — | — | — |
| 100 gal. A | 28.0 | 9.7 | — | 1000 | B.T. | — | — | — | — |
| 100 gal. A | 14.0 | 4.8 | — | 1000 | B.T. | — | — | — | — |
| 100 gal. A | 21.0 | 7.3 | 5 | 1000 | 5 | 13 | 21 | 30 | 39 |
| 100 gal. A | 44.0 | 15.3 | 8 | 1000 | 7 | 18 | 31 | 50 | 61 |
| 100 gal. A | 92.0 | 32.0 | 13 | 1000 | 16 | B.T. | — | — | — |
| 50 gal. B 100 gal. A | 19.0 | 6.6 | 4 | 1000 | 6 | 13 | 24 | 35 | 43 |
| 25 gal. C 100 gal. A | 47.0 | 16.4 | 6 | 1000 | 12 | 45 | 68 | B.T. | — |
| 25 gal. C | 24.0 | 8.3 | 5 | 1000 | 5 | 16 | 28 | 41 | 52 |

[1]B.T. indicates that the acid broke through the core.

TABLE II

| Additive Designation | Composition |
|---|---|
| A | The cross-linked copolymer of this invention. |
| B | A commercially available 1:1 blend of karaya gum and a dicyclopentadiene synthetic resin. |
| C | A commercially available aqueous dispersion containing about 4 lbs. per gallon of ground dicyclopentadiene and minor amounts of a dispersing agent and viscosifier. |

The foregoing tests and the results tabulated above show that the cross-linked copolymer of the invention is an effective fluid loss additive in 15 percent aqueous hydrochloric acid solution, and prevents channeling through 6½ inch long Bedford limestone cores. 50 gallons of the additive in 1000 gallons of acid solution are effective for controlling channeling in cores of up to about 3 millidarcies, and 100 gallons of the additive per 1000 gallons of acid function effectively as a fluid loss control composition on cores having permeabilities of from about 3 to about 17 millidarcies. Increasing the copolymer concentration in the acid solution up to 150 gallons of additive per 1000 gallons acid does not appear to change the fluid loss properties significantly.

The data also show that combining commercially available fluid loss additives with the copolymer additives of the present invention does not further improve the fluid loss control afforded by the additives of the invention. Fluid loss control is seem to be more effective where kerosene and then standard brine precede the acidizing, than in those runs in which kerosene alone precedes the acid. The former conditions of acidizing more accurately represent actual field usage conditions.

EXAMPLE 3

After conducting the dynamic fluid loss tests described in Example 2, which yield the results described in Table I, Bedford limestone cores acidized with the compositions of this invention are reversed in the Hassler sleeve. They are then subjected to back flow with kerosene for purposes of comparison with the initial flow of kerosene to determine the extent, if any, of permanent damage to permeability. In the back flow tests, all measurements are carried out at 200° F using 500 psi differential pressure across the cores. The results of the back flow tests are set forth in Table III.

TABLE III

| Gals. copolymer A/ 1000 gals. acid | Initial Kerosene Flow (mls/min) | Acid Flow (mls/time) | | | | | Kerosene Back Flow (mls/min) |
|---|---|---|---|---|---|---|---|
| | | 1 min. | 4 min. | 9 min. | 16 min. | 25 min. | |
| 50 | 7.4 | 4 | 10 | 14 | 20 | 26 | 6 |
| 100 | 28.0 | 12 | 19 | 27 | 33 | 42 | 77 |
| 150 | 28.0 | 10 | 19 | 35 | 45 | 57 | 42 |
| 150 | 40.0 | 12 | 23 | 35 | 46 | 59 | 36 |
| 150 | 46.0 | 10 | 20 | 29 | 38 | 49 | 40 |

EXAMPLE 4

In a laboratory test, a first aqueous solution is made up to 50 gallons which contains 80 lbs. of 2-acrylamido-2-methylpropanesulfonic acid, 4 lbs. of N,N'-methylenebisacrylamide and an amount of sodium hydroxide to neutralize the acrylamido monomer and 0.6 gallon of triethanolamine. A second solution is made up to constitute 50 gallons of 20 lbs. of sodium persulfate in water. The two solutions are then pumped into and through a mixing tube into a high-pressure line and delivered to the acid solution. The time is sufficiently long for cross-linking to occur, and the cross-linked copolymer is then extruded from the end of the line at 400 psi.

EXAMPLE 5

In order to evaluate the dispersing properties of the cross-linked copolymer of the invention in an acidizing solution when various amounts of the sulfonic acid-modified acrylamide monomer are used in forming the polymer, several tests are carried out in which the amount of monomer is varied in 100 gallons of the cross-linked copolymer gel formulated. The resulting copolymers are placed in a 15 percent aqueous hydrochloric acid solution. The pump pressure necessary to extrude the cross-linked copolymer is measured in two of the tests. The results of this evaluation are set forth in Table IV.

TABLE IV

| Lbs. Acid Monomer/ 100 Gals. of Cross-Linked Copolymer | Pump Pressure to Extrude Copolymer | Dispersing Properties of Copolymer in Acid |
|---|---|---|
| 60 | —* | Good |
| 80 | 400 | Fair |
| 160 | 1400 | Poor |

*Not determined

EXAMPLE 6

Fluid loss core tests are carried out to determine the effect of adding various amounts of cross-linked copolymer to 1000 gallons of 15 percent aqueous hydrochloric acid solution, and also the effect of varying the amount of 2-acrylamido-2-methylpropanesulfonic acid used in making the copolymer. The tests are carried out at 200° F and 500 psi differential pressure upon Bedford limestone cores mounted in a Hassler sleeve, and using as base acidizing solutions, 15 weight percent HCl aqueous solutions. The results of these tests are shown in Table V.

TABLE V

| Gal. copolymer/ 1000 gal. acid | Lbs. monomer/ 100 gal. copolymer | Kerosene Perm. (md) | Amount of Produced Fluid (Pore Volumes[3]) | | | | |
|---|---|---|---|---|---|---|---|
| | | | 1 min. | 4 min. | 9 min. | 16 min. | 25 min. |
| 100 | 40[1] | — | — | — | — | — | — |
| 100 | 60 | 9.7 | .16 | .40 | .67 | .91 | 1.23 |
| 100 | 60 | 10.0 | .23 | .44 | .70 | .93 | 1.23 |
| 100 | 60 | 10.4 | .21 | .49 | .81 | 1.16 | 1.58 |
| 50 | 80 | 4.5 | .14 | .33 | .53 | .72 | .98 |
| 50 | 160 | 4.5 | .14 | .37 | .60 | .84 | 1.12 |
| 50 | 80 | 6.9 | .19 | .37 | .60 | .88 | 1.21 |
| 50 | 80 | 8.7 | .28 | .84 | 1.53 | 2.05 | 2.60 |
| 100 | 80 | 4.2 | .12 | .28 | .44 | .60 | .77 |
| 100 | 80 | 10.8 | .33 | B.T.[2] | — | — | — |

[1]Copolymer did not solidify enough to conduct fluid loss tests.
[2]Fluid breakthrough.
[3]One pore volume is equal to about 21.5 milliliters.

The fluid loss core tests conducted to yield the results set forth in Table V show that concentrations of the acrylamido monomer lower than 60 lbs. per 100 gallons of the copolymer produced are preferably not utilized because the gelling rates obtained are too slow, and the gel does not become solid enough to give gel particles providing the most desirable diverting action. Considering the kerosene permeability of the test cores which range, as shown, from 4.2 millidarcies up to 10.8 millidarcies, the use of 60 lbs. of the monomer per 100 gallons of the cross-linked copolymer is shown to be nearly as effective as a fluid loss material made with higher concentrations of the monomer, even when the two types of copolymer are used in aqueous acid solutions at equal concentrations.

EXAMPLE 7

Several 50 gallon lots of a first aqueous solution (Solution 1) are made up by initially placing 40 gallons of water in a tank. 16.44 lbs. of sodium hydroxide are then added to the water. To some of the lots are then added from 1 to 3 lbs. of sodium sulfite activator. 80 lbs. of 2-acrylamido-2-methylpropanesulfonic acid are next added to each of the solutions, followed by the addition of 4 lbs. of N,N'-methylenebisacrylamide. The solutions are then stirred to thoroughly mix and dissolve the additives. Finally, 0.6 gallon of triethanolamine is added to each of the aqueous solutions.

A series of tests are conducted in which a lot (50 gallons) of Solution 1 is blended with a 50 gallon lot of a second solution (Solution 2) with stirring. Solution 2 is an aqueous solution containing the additives indicated in Table VI. The time required for the formation of the cross-linked copolymer after mixing is measured. The results of these tests are set forth in Table VI.

TABLE VI

| Additional Additive in Solution 1 | Additives in Solution 2 | | Time Required to Form Solid Copolymer |
|---|---|---|---|
| | $(NH_4)_2S_2O_8$ | Sodium Sulfite | |
| None | 4.2 lb. | None | 120 to 180 sec. |
| None | 8.3 lb. | None | 60 to 90 sec. |
| None | 16.7 lb. | None | 30 to 60 sec. |
| None | 33.4 lb. | None | 20 to 40 sec. |
| Na Sulfite 1.0 lb. | 16.7 lb. | 1 lb. | 15 to 30 sec. |
| Na Sulfite 1.0 lb. | 33.4 lb. | 1 lb. | 10 to 15 sec. |
| Na Sulfite 1.0 lb. | 16.7 lb. | 2 lb. | 15 to 20 sec. |
| Na Sulfite 2.0 lb. | 33.4 lb. | 2 lb. | 10 to 15 sec. |
| Na Sulfite 3.0 lb. | 16.7 lb. | 2 lb. | 15 to 20 sec. |
| Na Sulfite | 16.7 lb. | 2 lb. | 15 to 20 sec. |

From the data tabulated in Table VI, it will be perceived that increasing the amount of the persulfate initiator decreases the time in which copolymerization to a gelled state occurs, as does adding the sodium sulfite accelerator.

EXAMPLE 8

Visual hydration tests are conducted to determine the hydration susceptibility of solid particles of cross-linked copolymer made using 2-acrylamido-2-methylpropanesulfonic acid in accordance with the invention, and containing varying amounts of N,N'-methylenebisacrylamide in the copolymer. The tests are carried out by placing one gram of each sample in 50 mls of 15 percent aqueous hydrochloric acid solution. The solid particles formed in the acid are then examined visually. The results of these hydration tests are set forth in Table VII.

TABLE VII

| Wt. Percent of N,N'-methylenebisacrylamide in Cross-Linked Copolymer | Comparative Visual Hydration |
|---|---|
| 0.2 | Hydrated quickly to form clear gel particles |
| 1.0 | Hydrated less completely |
| 5.0 | Hydrated least |

From the results set forth in Table VII, it will be perceived that the best hydration of the solid particles occurs in the case of the copolymer containing 0.2 weight percent methylenebisacrylamide.

EXAMPLE 9

In a series of fluid loss core tests, 25 lbs. of solid particulate copolymer containing 0.2 weight percent N,N'-methylenebisacrylamide cross-linked with 2-acrylamido-2-methylpropanesulfonic acid are placed in 1000 gallons of 15 weight percent aqueous hydrochloric acid solution. Bedford limestone cores 6.5 inches in length and 1.75 inches in diameter are set up for the tests in the manner described in Example 2. The tests are carried out at a temperature of 200° F and a pressure differential across the cores of 500 psi. In making up the acidizing solutions, quantities of the copolymer having varying particle size ranges are used in the different acid solutions tested as indicated in Tables VIII and IX. Comparative tests are also carried out using a commercially available acidizing composition as set forth in Table VIII. In carrying out the tests, initial permeability in measured by kerosene flow through the core. The kerosene flow is followed by brine, followed finally by the flow of the acidizing solution through the core. The results of the tests are set forth in Table VIII.

TABLE III

| Fluid Loss Additive | Kerosene Perm. (md) | Acid Fluid Loss (Pore Volumes[3]) | | | | |
|---|---|---|---|---|---|---|
| | | 1 min. | 4 min. | 9 min. | 16 min. | 25 min. |
| Cross-linked Copolymer A[1] | 2.5 | .14 | .42 | * | * | * |
| Cross-linked Copolymer A | 2.5 | .09 | .35 | .84 | * | * |
| Cross-linked Copolymer B[1] | 2.5 | .12 | .30 | .56 | .84 | 1.08 |
| Cross-linked Copolymer B | 3.0 | .14 | .37 | .70 | 1.02 | 1.62 |
| Commercially Available Fluid Loss Additive[2] | 2.0 | .05 | .21 | .58 | * | * |
| Commerically Available Fluid Loss Additive[2] | 2.1 | .05 | .30 | * | * | * |

*The acid had broken through the core.
[1]Range of particle size of copolymers A and B shown in Table IX.
[2]A commercially available 1:1 blend of karaya gum and a dicyclopentadiene synthetic resin.
[3]One pore volume is equal to about 21.5 milliliters.

TABLE IX

| U.S. Sieve Size | Copolymer Sample Used, Weight Percent | |
|---|---|---|
| | A | B |
| −40+100 | 71 | 40±10 |
| −100+200 | 23 | 30±10 |
| −200+325 | 6 | 30±10 |

The tabulated results demonstrate that the particle size distribution characteristic of copolymer sample B is to be preferred to a range which includes more of the relatively larger particles as typified by copolymer sample A. When the most appropriate particle size distribution is employed in the added copolymer, the acidizing composition performs better than the acidizing composition formulated with the commercially available fluid loss additive as tested for comparison purposes.

EXAMPLE 10

A series of dynamic fluid loss core tests are carried out in the manner described in Example 2, and using Bedford limestone cores of the type described. The tests are carried out at 200° F and 500 psi differential pressure across the core. 15 weight percent aqueous hydrochloric acid solutions containing varying amounts of the preferred cross-linked copolymer are employed. The copolymer, in each run, has the particle size distribution indicated in Table X, and the results of the dynamic fluid loss tests using the Bedford cores are also set forth therein.

TABLE X

| Lbs. Copolymer[1]/ 1000 Gal. Acid | Sieve Size | Kerosene Perm. (md) | Acid Flow (Pore Volumes[6]) | | | | |
|---|---|---|---|---|---|---|---|
| | | | 1 min. | 4 min. | 9 min. | 16 min. | 25 min. |
| 100 | −40+60 | 8.0 | .23 | .93 | 1.63 | 2.19 | —[2] |
| 100 | −80+100 | 8.0 | .14 | .42 | .65 | .98 | 1.30 |
| 100 | −100 | 7.7 | .19 | .51 | .79 | 1.07 | 1.49 |
| 50 | Blend A[3] | 17.8 | .70 | —[2] | — | — | — |
| 50 | Blend A | 10.5 | .19 | .47 | .79 | 1.16 | 1.63 |
| 50 | Blend A | 9.4 | .23 | .56 | .93 | 1.44 | 1.77 |
| 50 | Blend A | 2.9 | .09 | .28 | .47 | .70 | .88 |
| 25 | Blend A | 4.2 | .14 | .51 | .98 | 1.40 | 1.77 |
| 25 | Blend A | 3.6 | .09 | .28 | .51 | .70 | 1.02 |
| 100 | −40'100 | 3.5 | .14 | .42 | .60 | .88 | 1.26 |
| 100 | −40+100 | 4.1 | .14 | .42 | .60 | .88 | 1.26 |
| 100 | −40+100 | 10.5 | .28 | .88 | 1.58 | 2.23 | 3.35 |
| 100 | −40+100 | 10.7 | .28 | .98 | 2.04 | 2.93 | 4.00 |
| 100 | Blend B[4] | 2.7 | .09 | .28 | .47 | .65 | .88 |
| 100 | Blend B | 10.7 | .23 | .65 | 1.07 | 1.67 | 2.14 |
| 50 | Blend B | 10.5 | .19 | .56 | .93 | 1.49 | 1.95 |
| 100 | Blend C[5] | 12.1 | .14 | .42 | .74 | 1.30 | 1.72 |
| 50 | Blend C | 10.5 | .19 | .47 | .79 | 1.16 | 1.63 |
| 25 | Blend C | 4.1 | .09 | .28 | .42 | .70 | .98 |

[1]Copolymer of 2-acrylamido-2-methylpropanesulfonic acid and N,N'-methylenebisacrylamide.
[2]Acid broke through core.
[3]Blend A:

| Sieve Size | % on Each Sieve |
|---|---|
| −12+20 | 5 |
| −20+40 | 5 |
| −40+100 | 25 |
| −100 | 65 |

[4]Blend B: 60% through a 40 mesh sieve on a 100 mesh sieve, 40% through a 100 mesh sieve.
[5]Blend C: 40% through a 40 mesh sieve on a 100 mesh sieve, 60% through a 100 mesh sieve.
[6]One pore volume is equal to about 21.5 milliliters The results tabulated in Table X indicate that the varying particle size ranges used in the several acid solutions all performed generally satisfactorily on cores of the permeability indicated. Superior results are achieved where a major portion of the particles will pass through an 80 mesh screen or smaller. The results also indicate that 25 lbs. of the copolymer per 1000 gallons of the acid solution is an adequate usage level for fluid loss control in formations having relatively low permeabilities of around 4 millidarcies or less, while 50 to 100 lbs. of the copolymer is preferably added to the acid solution for formations having higher permeabilities of about 9 millidarcies or higher.

EXAMPLE 12

A dry, particulate cross-linked copolymer (from 2-acrylamido-2-methylpropanesulfonic acid and N, N'-methylenebisacrylamide) is prepared by adding 6.7 weight percent of ammonium chloride to the wet copolymer gel to facilitate drying. The range of particle size in the dry copolymer is determined by sieve analysis as set forth in Table XI. 50 lbs. of the copolymer particles are then added to 1000 gallons of 15 percent aqueous hydrochloric acid, and the acidizing composition is used in fluid loss control and permeability damage tests employing Bedford limestone cores of the length and diameter hereinbefore described. A temperature of 200° F and differential pressure of 500 psi are used in the tests. The previously described procedure of subjecting the cores initially to kerosene flow, followed by brine flow prior to the time that the acidizing composition is utilized, is followed. Upon completion of the acidizing test, back flows of standard brine solution and of kerosene through the core are evaluated to determine the extent of any damage to permeability. The results of these tests appear in Table XII.

TABLE XI

| Sieve Size (U.S. Std.) | Weight Percent on Each Sieve |
|---|---|
| + 40 | 3 |
| − 40 + 100 | 31 |
| −100 + 200 | 32 |
| −200 + 325 | 15 |
| −325 | 19 |

TABLE XII

| Kerosene Flow (mls/min) | Brine Flow (mls/min) | Acid Fluid Loss (mls/25 min) | Brine Back Flow (mls/min) | Kerosene Back Flow (mls/min) |
|---|---|---|---|---|
| 16.7 | 6.0 | 34.0 | 19.3 | 15.0 |
| 7.7 | 1.7 | 12.5 | 4.0 | 6.4 |
| 10.5 | 2.2 | 39.0 | 4.1 | 6.0 |

The test results reproduced in Table XII show that dry particulate copolymer characterized by the particle size range described in Table XII functions effectively as a fluid loss additive when incorporated in 15 percent aqueous hydrochloric acid solution. Moreover, the test results upon back-flowing with standard brine and with kerosene show that permeability is not significantly impaired.

EXAMPLE 13

A further series of tests are conducted in which 50 lbs. of the preferred cross-linked copolymer of the invention are placed in an acidic base fluid and used in dynamic fluid loss core tests of the type previously described. Bedford limestone cores having a length of 6.5 inches and a diameter of 1.75 inches are used. The pressure differential across the cores is 500 psi, and the temperatures employed are those set forth in Table XIII in which the results of the tests are reported. In all of the runs carried out except Runs 10 and 11, the acidic base fluid used is an aqueous solution containing 15 percent HCl and 0.3 percent by volume (of the acid) of a corrosion inhibitor. In Run 10, an acid emulsion is utilized which contains 66 percent by volume oil and 33 percent by volume of an aqueous acid solution containing 28 percent HCl. In Run 11, an acid emulsion is utilized which contains 66 percent by volume oil and 33 percent by volume of an aqueous acid solution containing 15 percent HCl. The results of these fluid loss tests are reported in Table XIII.

TABLE XIII

| Run | °F | Kerosene Flow[1] (mls/min) | Brine Flow (mls/min) | Acid Fluid Loss (mls/25 min) |
|---|---|---|---|---|
| 1 | 200 | 6.1 | 1.6 | 22 |
| 2 | 200 | 4.0 | 1.3 | 17 |
| 3 | 200 | 8.4 | 0.7 | 32 |
| 4 | 200 | 10.5 | 2.2 | 39 |
| 5 | 200 | 7.2 | 1.7 | 23 |
| 6 | 200 | 8.8 | 2.2 | 35 |
| 7 | 250 | 13.2 | 2.6 | 25 |
| 8 | 250 | 5.6 | 1.2 | 15 |
| 9 | 250 | 7.2 | 2.2 | 52 |
| 10 | 200 | 14.0 | 2.6 | 32 |
| 11 | 200 | 16.5 | 3.0 | 13 |

[1]6.4 mls of kerosene flow under the test conditions is equal to approximately 1.0 millidarcy permeability.

The test results reported in Table XIII demonstrate the effectiveness of the additive of the invention in acid emulsions, as well as in aqueous acidizing compositions.

In using treating fluids, including acidizing compositions and fracturing compositions, prepared in accordance with the present invention, the fluid loss/diverting agent additive hereinbefore described is added to the base liquid, which may be an aqueous acid solution, an oil-acid emulsion or other treating fluid used for acidizing or fracturing. The treating fluid is then forced into the formation at a pressure greater than the formation pressure, which pressure will, of course, depend upon the specific character of the formation, and the type of treatment being undertaken. The treating composition can be used at temperatures from ambient up to about 400° F without loss of effectiveness of the fluid loss additive.

After the injection of the treating composition into the formation has been completed, and the treatment effected by projection of the composition, through diversion, into the remote zones of the formation which it is desired to reach, the film of protective gel formed by the additive of the invention can be removed by back flushing or other removal procedures well understood in the art.

In the foregoing description of the invention, exemplary practice of the invention has been set forth to enable those skilled in the art to understand the basic principles underlying the invention, and to have sufficient knowledge and comprehension of these principles to extrapolate them to other suitable materials and procedures which are not specifically mentioned or dealt with herein. Changes and alterations which involve a continued reliance on such basic underlying principles are deemed to be circumscribed by the spirit and scope of the invention, except as the same may be necessarily limited by the appended claims or reasonable equivalents thereof.

What is claimed is:

1. An acidizing composition for use in acidizing a subterranean formation comprising
   an acidic base fluid; and
   from about 25 pounds to about 100 pounds per 1000 gallons of the base fluid of a crosslinked copolymer of a sulfonic acid-modified acrylamide monomer and a polyvinyl crosslinking agent;
   wherein said sulfonic acid-modified acrylamide monomer is characterized in having the structural formula:

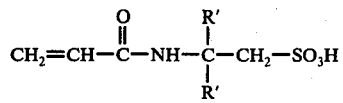

wherein R' and R" are selected from the group consisting of $CH_3-$, $CH_2Cl-$, $CH_3-CH_2-$, $CH_3-CH_2-CH_2-$, and H, and may be the same or different; and
   wherein said polyvinyl crosslinking agent is an alkylidene bisacrylamide in which the alkylidene group contains from one to three carbon atoms; and still further
   wherein said crosslinked copolymer contains from about 0.1 to about 20 weight percent of the polyvinyl crosslinking agent and the balance is the sulfonic acid-modified acrylamide monomer.

2. An acidizing composition as defined in claim 1 wherein said sulfonic acid-modified acrylamide monomer is 2-acrylamido-2-methylpropanesulfonic acid.

3. An acidizing composition as defined in claim 1 wherein said alkylidene bisacrylamide is N,N'-methylenebisacrylamide.

4. An acidizing composition as defined in claim 3 wherein said sulfonic acid-modified acrylamide monomer is 2-acrylamido-2-methylpropanesulfonic acid.

5. An acidizing composition as defined in claim 4 wherein the mole ratio of 2-acrylamido-2-methylpropanesulfonic acid to N,N'-methylenebisacrylamide in the cross-linked copolymer is about 11.4:1.

6. An acidizing composition as defined in claim 1 wherein the acidic base fluid contains an acid selected from the group consisting of HCl, HF, HCl - organic acid blends and mixtures of HCl and HF.

7. An acidizing composition as defined in claim 6 wherein the acidic base fluid is an aqueous solution containing from about 10 weight percent to about 30 weight percent HCl.

8. An acidizing composition as defined in claim 1 wherein said acidizing composition contains about 50 lbs. of crosslinked copolymer per 1000 gallons of acidic base fluid.

9. An acidizing composition as defined in claim 6 wherein said acidic base fluid is an emulsion containing about 66 volume percent oil and about 33 volume percent of an aqueous solution of HCl.

10. The method of preparing a treating composition for injection into a subterranean formation to increase hydrocarbon production therefrom comprising:
    the step of reacting with an alkylidene bisacrylamide crosslinking compound, in which the alkylidene group contains from one to three carbon atoms and in the presence of a suitable copolymerization catalyst and water, a sulfonic acid-modified acrylamide monomer having the formula

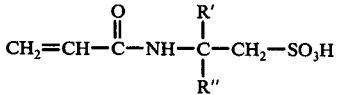

wherein R' and R" are selected from the group consisting of $CH_3-$, $CH_2Cl-$, $CH_3-CH_2-$, $CH_3-CH_2-CH_2-$, and H, and may be the same or different, to form a crosslinked copolymer; and the step of adding an effective diverting agent amount of said copolymer to an aqueous solution to form small particles of an aqueous copolymer gel in the aqueous solution;

wherein said reacting step is carried out by initially preparing a first substantially neutral aqueous solution containing (a) from about 0.5 to about 3.0 pounds of said monomer neutralized with base per gallon of aqueous solution, (b) from about 0.01 to about 0.70 pound of crosslinking compound per gallon of the aqueous solution, and (c) an effective amount of a tertiary amine copolymerization catalyst; then adding to said first solution, in a volumetric amount substantially equivalent to the volume of said first solution, a second aqueous solution containing from about 0.1 to about 0.5 pound of an oxidizing compound initiator per gallon of said second solution to form said copolymer.

11. The method defined in claim 10 wherein in said reacting step said first and said second aqueous solutions are combined in a mixing tube and the resulting crosslinked copolymer is extruded under pressure into said aqueous solution referred to in said adding step.

12. The method defined in claim 10 further characterized to include the further steps of adding to said combined first and second aqueous solutions in said reacting step an effective amount of a drying agent selected from the group consisting of alkali metal chlorides and ammonium chloride; then drying said combined solutions to remove the water therefrom and yield dry particulate cross-linked copolymer prior to addition of the copolymer to said aqueous solution referred to in said adding step.

13. The method defined in claim 12 wherein, prior to addition of said dried particulate crosslinked copolymer to said aqueous solution referred to in said adding step, the copolymer particles are classified to provide a particle size range such that, in the copolymer added to said aqueous solution referred to in said adding step, not more than 10 weight percent of the added dry copolymer particles are retained on a 40 mesh U.S. Standard Sieve, and not less than 20 weight percent will pass through a 325 mesh U.S. Standard Sieve.

14. The method defined in claim 12 wherein, prior to addition of said dried particulate crosslinked copolymer to said aqueous solution referred to in said adding step, the copolymer particles are classified to provide a particle size range such that, in the copolymer added to said aqueous solution referred to in said adding step, not more than 10 weight percent of the added dry copolymer particles are retained on a 40 mesh U.S. Standard Sieve, and not more than 20 weight percent will pass through a 325 mesh U.S. Standard Sieve.

15. A method of temporarily diverting an aqueous treating fluid from portions of a subterranean formation to improve the permeability of other portions of the formation comprising:

combining with said treating fluid, a copolymer of from about 0.1 to about 20 weight percent N,N'-methylenebisacrylamide with the balance being a sulfonic acid-modified acrylamide monomer having the formula

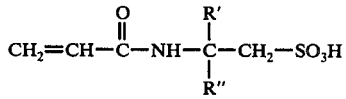

wherein R' and R" are selected from the group consisting of $CH_3-$, $CH_2Cl-$, $CH_3-CH_2-$, $CH_3-CH_2-CH_2-$, and H, and may be the same or different;

introducing the aqueous treating fluid containing the copolymer into the formation to form a gelatinous film over portions of the formation from which the treating fluid is to be temporarily diverted; and subsequently removing the gelatinous film from the formation.

16. The method of claim 15 wherein said subterranean formation, into which said aqueous treating fluid is introduced, has a temperature of up to about 350° F.

17. The method defined in claim 15 wherein said treating fluid is introduced into the formation at a pressure sufficiently high to fracture the formation.

* * * * *